United States Patent [19]

Jumel et al.

[11] 4,018,970
[45] Apr. 19, 1977

[54] ELECTRIC CELL

[75] Inventors: Yves Jumel; Jean-Paul Gabano, both of Poitiers, France

[73] Assignee: Saft-Societe des Accumulateurs Fixes et de Traction, Romainville, France

[22] Filed: Oct. 10, 1975

[21] Appl. No.: 621,383

[30] Foreign Application Priority Data

Oct. 17, 1974 France .............................. 74.34867
June 30, 1975 France ............................. 75.20497

[52] U.S. Cl. .............................. 429/162; 429/194; 429/218; 429/225
[51] Int. Cl.² ......................................... H01M 6/14
[58] Field of Search ................ 136/6 LN, 20, 83 R, 136/107, 100 R, 120 R, 137, 154, 118, 111; 429/162, 194, 218, 225

[56] References Cited

UNITED STATES PATENTS

| 3,822,148 | 7/1974 | Dey et al. | 136/83 R |
| 3,853,627 | 12/1974 | Lehmann et al. | 136/83 R |
| 3,871,915 | 3/1975 | Brych | 136/6 LN |

Primary Examiner—Anthony Skapars
Attorney, Agent, or Firm—Kenyon & Kenyon Reilly Carr & Chapin

[57] ABSTRACT

Electric cell having a positive electrode comprising an active material intimately intermixed with an electronic conductor, a negative electrode and an electrolyte whose solvent is a non-aqueous liquid. According to the invention, the said electronic conductor is selected so as to bring down the discharge voltage peak of the cell occurring at the beginning of the discharge to or close to the desired operative voltage discharge level required in use of the cell. Batteries according to the invention are advantageously used in watches.

25 Claims, 4 Drawing Figures

ELECTRIC CELL

BRIEF SUMMARY OF INVENTION

An object of the invention is an electric cell having a positive electrode comprising an active material and an electronic conductor, a negative electrode and an electrolyte whose solvent is a non-aqueous liquid wherein the initial discharge level is at a value equal to or in the neighborhood of the desired discharge voltage during use of the cell.

Such cells comprise, in general, a highly reactive negative electrode made of an alkaline metal such as lithium or sodium. The positive active material is constituted by an oxidizing compound such as an oxide or an oxidizing salt (for example, a chromate) of a metal, the latter possibly representing the reduced form of the positive electrode. In general, these oxides or odizing salts are not electronically conductive and it is necessary to add thereto an electronic conductor for the positive electrode to have acceptable electric conductivity in the charged state. For reasons of chemical inertia, mechanical properties and economy, carbon has often be used in the form of graphite or soot. It has nevertheless been observed that at the beginning of the discharge of these cells, the initial discharge voltage at the terminals was very high and that the cell reached its operative discharge level voltage only after a certain period of time, depending on the discharge rate through the load and that this time could reach several hours at slow discharge rates. That phenomenon has serious drawbacks for a greater number of applications, such as in watch-making applications which require, from the power source, a voltage defined within narrow limits and wherein any excessive voltage can even destroy delicate equipment at the time of the replacement of the batteries, for example, in watches. The protection of the equipment against this phenomenon by an electronic regulating device would be expensive and bulky and, moreover, useless during the greater part of the discharge time for cells whose discharge level is truly horizontal.

The present invention is intended to obviate such drawbacks and eliminate any need for electronic regulating devices by providing an electric cell whose original discharge voltage is practically concurrent or nearly so with the desired general discharge voltage level during useful cell life.

It has among its objects an electric cell having a positive electrode comprising a positive active material and an electronic conductor in intimate inter-mixture with it, a negative electrode and an electrolyte whose solvent is non-aqueous, characterized in that the electronic conductor and the reduction product of the positive active material resulting from the discharge of the cell have a decomposition overvoltage with respect to the said solvent such that the decomposition of the said solvent takes place at a voltage lower than the reduction voltage of the positive active material during the discharge of the cell.

According to one advantageous embodiment, the said electronic conductor is constituted generally by a material selected from the group consisting of lead, tin, gold, bismuth, zinc, cadmium and their alloys.

According to another embodiment, the said electronic conductor is an amalgam of such a metal. Nevertheless, the use of amalgamating mercury in cells whose electrolyte comprises a non-aqueous solvent is compatible only with solvents which do not react with mercury. It should be observed that more particularly, ethers would not be suitable as electrolyte solvents in such cases.

According to an advantageous embodiment, the positive active material is selected from the group consisting of oxides and oxidizing salts in which the reduction in discharge of the active material leads to metals of the group consisting of lead, tin, gold, bismuth, zinc, cadmium and their alloys. It is nevertheless not compulsory for the metal of the oxide or of the oxidizing salt of the active material nor for one of its metals, in the case of an alloy or an amalgam, to be the same as the metal of the electronic conductor.

It can be supposed that the favorable result of the practice of this invention is due to the following mechanism. There is, on the positive electrode of the cell, a competition between the reduction of the active material and the reduction (or decomposition) of the electrolyte, the reaction which fixes the voltage of the electrode being that which takes place at the highest potential. When the electrolyte decomposition reaction takes place on the electronic conductor at a potential which is higher than the positive active material reduction potential, the potential of the positive electrode is fixed by that of the electrolyte decomposition reaction, or, rather, is constituted by a mixed potential and then it tends towards the potential level of the reduction of the active material as the polarization of the electronic conductor takes place in relation to that decomposition reaction.

On the contrary, when the electronic conductor has, in relation to the decomposition of the electrolyte, an overvoltage such that the decomposition takes place only at a potential lower than the positive active material reduction potential, the electrolyte decomposition does not take place before the discharge of the positive active material, since that latter reduction maintains the electrode at a potential which is too high for the decomposition to take place. Nevertheless, if, on reduction, the active mterial yields a metal which does not have a sufficient overvoltage in relation to the electrolyte decomposition reaction so that this reaction can take place at the reduction voltage of the positive active material or at a higher voltage, the electrolyte decomposes and the potential of the positive electrode rises until the metal formed is polarized. In order to prevent high interference voltages it is therefore preferable to use active materials whose reaction product is either a non-conductive oxide or a metal having a sufficient overvoltage with respect to the decomposition of the electrolyte. Copper, for example, does not have a sufficient overvoltage, and therefore, the positive active materials basically containing copper (CuO, CuS) have original voltages which are higher than the level voltage, even if the electronic conductors added to the active material have an adequate overvoltage.

Other objects and features of the invention will become apparent from the following detailed description, examples and accompanying drawings in which.

DETAILED DESCRIPTION

Figure 1:
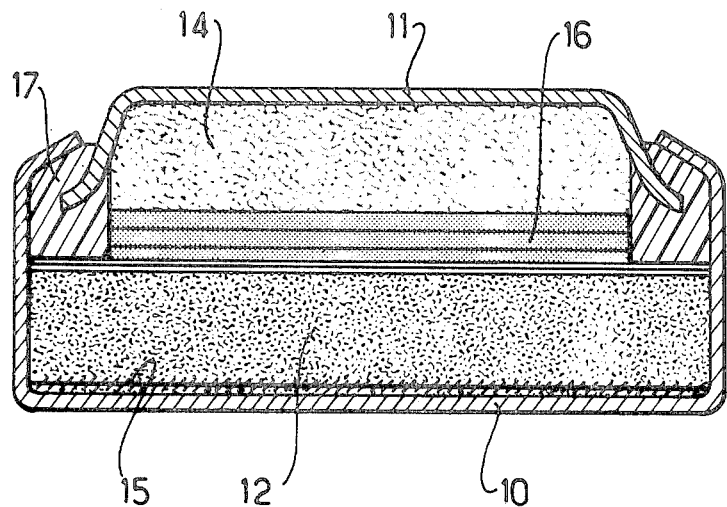
FIG. 1 is a cross-section of a battery used for tests.

Example I: To perform tests, batteries of the button type such as shown in FIG. 1, having an outside diameter of 11.4 mm, a height of 5.35 mm and whose casing is made of nickel steel having a thickness of 0.25 mm, having been built. The two cups 10 and 11 of the casing are separated by an insulating seal 17 made of polypropylene. The positive electrode 14 having a thickness of 1.35 mm (it is compressed at a constant thickness) is fitted into the cup 11 and one of its faces which is turned toward the negative electrode has a diameter of 8.7 mm and hence a surface of about 60 sq. mm. The positive mass is separated from the negative electrode 12 made of lithium, having a thickness of 2 mm. by several layers 16 of a cellulose felt. The positive mass 14 is constituted by an intimate intermixture of 95% (by weight) of powdered lead oxide PbO and 5% (by weight) of powdered graphite. Its total weight is 1.04 g. The assembly is impregnated with an electrolyte which is a 2.5 M solution of lithium perchlorate in dioxane as solvent. Reference 15 is a nickel steel grid welded to the cup 10 and partially embedded or incrusted in the negative active material, which makes it possible to ensure good electrical contact therewith.

Figure 2:
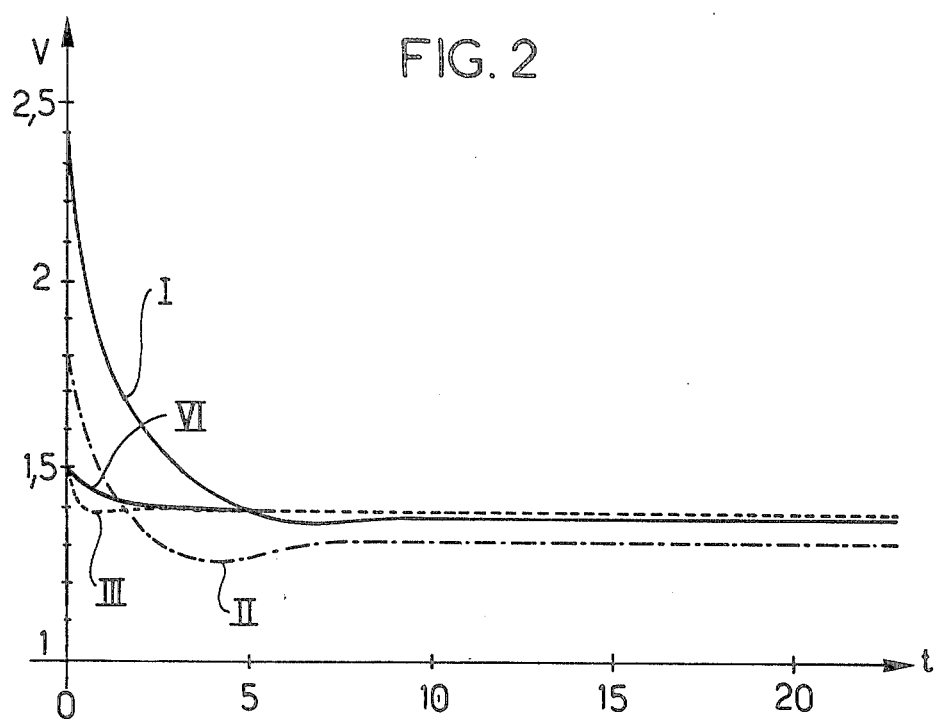
FIG. 2 shows the discharge curves of our batteries, three of which (II, III and VI) are batteries according to the invention and one of which (I) is a battery according to prior art.

The curve I in FIG. 2 shows the discharge voltage V of the above battery as ordinates and with time as abscissa during the first 24 hours of the discharge of that battery across a resistor of 5000 ohms. As will be seen, the battery, which in an open circuit, has a voltage of 3.47 volts, has an original discharge voltage of 2.4 volts and only reaches 1.5 volts, which is a voltage close to that of the desired discharge level of 1.4 volts, only after about 3 hours. The excess initial discharge voltage is thus 1 volt, which is unsatisfactory for safe electronic operation of watches.

Example II: In a battery as built having similar geometrical characteristics and components as that of Example I, except that the graphite constituting the electronic conductor of the positive mass was replaced by powdered tin. The quantity of tin intimately intermixed with the powdered lead oxide was such that its volume be approximately that of the graphite in the first case. The percentage (by weight) is then 16% of tin in powdered form and 84% of powdered lead oxide. The total weight of the positive mass for a volume equal to that of the positive mass of the Example I was then 1.15 g. The other components were identical to those of the first example. The curve II in FIG. 2 represents the first 24 hours of discharge of the battery. As will be seen, the resulting battery, which has a voltage, in an open circuit, of 2.59 volts has an original discharge voltage of 1.8 V, which is less than that of the battery in the Example I. It will be seen, therefore, that the battery of this Example II which is according to the invention, will not produce an excess of initial discharge voltage as great as that of the battery according to the prior art tested in the Example I, since it is only 0.5 volts (1.8 volts initially for a discharge level of 1.3 V.) The battery according to the invention described in this Example could be used without danger of damaging delicate mechanisms.

Example III: Another battery according to the invention was provided in the same way as the first two with like components but the electronic conductor of the positive mass was replaced by powdered lead. The principle of the choice of amount of lead was the same as for the tin of the Example II and a positive active mass with 23% by weight of powdered lead and 77% by weight of powdered lead oxide intimately intermixed and compressed was used. The positive mass has a weight of 1.20g. The other components were identical to those of the first two examples. The curve III in FIG. 2 shows the first 24 hours of discharge of that battery according to the invention. For an open circuit cell voltage of 2.37 volts, the original or initial discharge voltage is 1.5 volts, this being very close to the desired level of discharge voltage of 1.4 volts and is reached very shortly after commencement of discharge. This time, not only is the battery not in danger of destroying delicate mechanisms but also, it will not cause a disturbance, for example, in the mechanism of a watch.

Example IV: Batteries of the button type of the same sort and components as that which is described in the first example were prepared. The only difference resided in that the positive active mass was constituted by an intimate intermixture of powdered lead oxide PbO as the active material and of zinc powder as the electronic conductor in respective proportions of 84.3% and 15.7% by weight. The total weight of the positive mass was 0.950 g. The curve VI of a discharge across a 5000 ohm resistor is shown in FIG. 2 during the first three hours. The voltages V are shown as the ordinate and the time t is shown as the abscissa. As can be seen in that figure, the original discharge voltage V is 1.5 volts and the 1.4 volt discharge level is reached in about half an hour. This embodiment can be safely used in watches.

Figure 3:
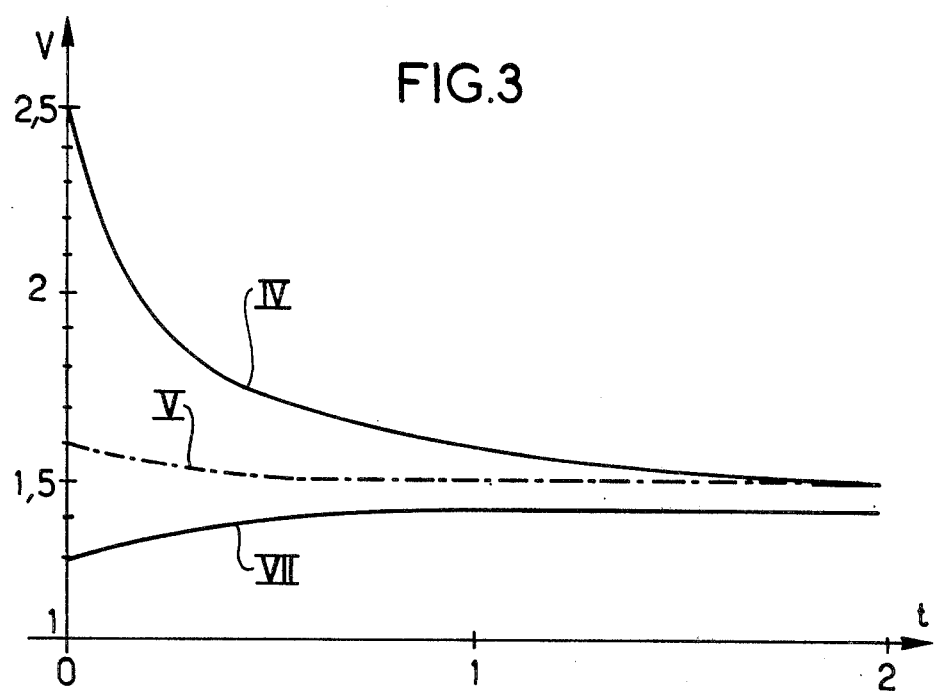
FIG. 3 shows the discharge curves of three different batteries two of which (V and VII) are batteries according to the invention and the other of which (IV) is a battery according to prior art.

Example V: A battery still of the same type as described in the first example with like components except that its positive mass consisted of 95% by weight of powdered lead molybdate ($MoO_5Pb$) and 5% by weight of powdered graphite was built. This battery was discharged across a resistor of 5000 ohms and the curve IV in FIG. 3 represents the first two hours of the discharge of that battery. The open circuit voltage was 3.03 volts and the original or initial discharge voltage was 2.5 V. It will be seen that only after the two hours, the discharge level, which is about 1.5 volts, was just reached, the difference between the original or initial discharge voltage and the level discharge voltage is 1 volt. This type with graphite is unsuitable because of such high original discharge voltage for use in watches.

Example VI: On the contrary, for the same active materials as in the Example V, replacing, according to the invention, the graphite by 16% by weight of powdered tin, it will be seen on the curve V in FIG. 3 that this battery which provides 2.6 volts in an open circuit has an original or initial discharge voltage of only 1.6 volts. This voltage falls to about 1.5 volts in under 1 hour. Here again, the gain effected by use of the present invention will be apparent. The voltage variation during discharge is only about 0.1 volts. It is useful as a power supply for electric watches.

Example VII: Other batteries of the same type with like components have been prepared except that the positive mass therein was constituted in intimate intermixture of powdered lead molybdate ($MoO_5Pb$) as the active material and of zinc powder as the electronic conductor in respective proportions of 84.3% and 15.7% by weight. The total weight of the positive mass was 750 mg. Batteries according to this example were discharged across a resistor of 5000 ohms and FIG. 3 shows the discharge curve VII during the first two hours with the same co-ordinates as the previous curves of FIG. 3. The initial discharge voltage of 1.3 volts rises to the desired discharge 1.4 voltage in under 1 hour.

Example VIII: In other batteries of the same type and like components except that the positive active mass was constituted by an intimate intermixture of minium ($Pb_3O_4$) as the active material and of powdered graphite as the electronic conductor in respective proportions by weight of 95% minium and 5% graphite. The total weight of the mass was 620 mg. The average discharge curve of these Example VIII batteries across a resistor of 5000 ohms is represented by the curve VIII in FIG. 4, on which the time $t$ in hours is shown as the abscissa and the voltage V in volts is shown as the ordinate. Curve VIII shows an original discharge voltage of 2.6 volts, which, after three hours, has only been lowered to 1.8 volts. The desired discharge voltage at the 1.4 volts level was found to be reached only after about twenty hours of discharge. The difference of 1.2 volts between original discharge voltage and desired useful discharge voltage is 1.2 volts which renders this battery unsatisfactory for use in watches.

Example IX: In similar batteries having the same components as in Example VIII, except that the graphite constituting the electronic conductor was replaced by tin powder in respective proportions by weight of 84% minium and 16% of tin powder. The discharge curve across a 5000 ohm resistor during the first three hours is represented by the curve IX in FIG. 4. The original discharge voltage is only 1.5 volts and, after a slight rise, it again reaches the 1.4 volt level after about two and a half hours. The difference of 0.1 volt between initial discharge voltage and desired discharge voltage makes these batteries useful in watches.

Figure 4:
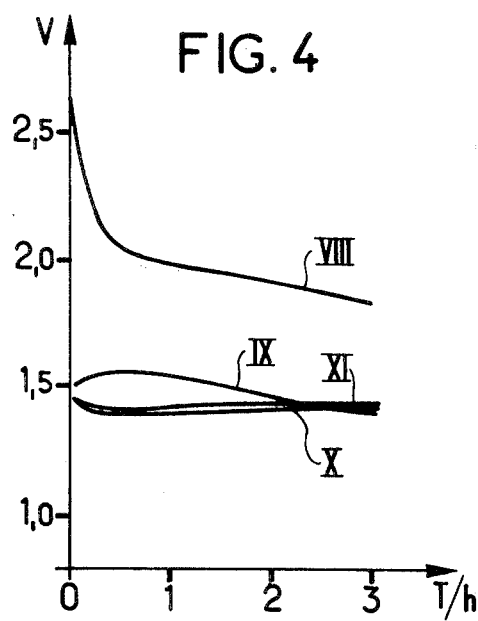
FIG. 4 shows the discharge curves of four batteries, three of which (IX, X, XI) are batteries according to the invention and one of which (VIII) is a battery according to prior art.

Example X: again, in similar batteries, the positive mass was constituted by a mixture of minium $Pb_3O_4$ as the active material, with lead powder as the electronic conductor in respective proportions by weight of about 77% of powdered lead oxide and 23% of powdered lead, the curve of a discharge across a resistor of 5,000 ohms during the first three hours is represented by the curve X in FIG. 4. As will be seen from the outset, the discharge voltage of the battery is close to the 1.4 volt level.

Example XI: Batteries which differ from those of Example X in that the electronic conductor of the positive mass was, this time, powdered zinc in a proportion by weight of 15.7% of zinc for 84.3% of minium $Pb_3O_4$, were discharged in the same conditions: their discharge curve is represented by the curve XI in FIG. 4. Such curve, it can be seen, is very close to the curve X of FIG. 4 and, indeed, is practically merged with the latter. They have been shown separately for the sake of clarity in the drawing, but are both situated practically at the desired 1.4 volt level with an original discharge voltage of less than 1.5 volts. Such batteries, too, are useful in watches.

These examples and the curves shown in FIGS. 2, 3 and 4 show clearly that with electronic conductors according to the invention, the discharge voltage level of the active material is reached by the cell substantially from the outset of discharge or very shortly thereafter whereas with graphite as electronic conductor the discharge voltage in each as shown in FIGS. 2, 3 and 4, curves I, IV and VIII starts at the decomposition voltage of the solvent of the electrolyte (which is dioxolane) which is much higher than the desired discharge voltage and that during a period which can vary between one hour and twenty or more hours, depending on the load conditions, the discharge voltage remains at mixed values which, by their magnitude risk damaging the appliances such as watches powered by batteries having such a positive active mass.

In a general way, it will be observed and found that another advantage of the invention resides in the fact that there is practically no longer any decomposition of the electrolyte and hence, no longer any evolution of gases or polymerization.

Of course, the invention is in no way limited to the embodiments described and illustrated, which have been given only by way of examples. More particularly, without departing from the scope of the invention and claims, certain means or components can be replaced by equivalent means or components.

An application is found for the invention more particularly in the field of electric watch-making for powering watches.

What is claimed is:

1. Electric cell powering delicate equipment such as watches, said cell having a positive electrode comprising a positive active mterial and an electronic conductor in intimate mixture with it, a negative electrode and an electrolyte whose solvent is a non-aqueous liquid, characterized in that the said electronic conductor and the reduction product of the positive active material resulting from the discharge of the cell having a decomposition overvoltage with respect to the said solvent such that the decomposition of the said solvent takes place at a voltage lower than the reduction voltage of the positive active material during the discharge of the cell, thereby reducing the voltage peak at the beginning of cell discharge to close the desired discharge voltage level during use of the cell.

2. Electric cell according to claim 1, characterized in that the said electronic conductor is constituted by a metal selected from the group consisting of lead, tin, and zinc.

3. Electric cell according to claim 2, characterized in that the said electronic conductor is constituted by an amalgam of a said metal, the said solvent being selected from among the solvents compatible with mercury.

4. Electric cell according to claim 1, characterized in that the said positive active material is selected from the group consisting of oxides and oxidizing salts in which the reduction in discharge leads to metals selected from the group consisting of lead, tin and zinc.

5. Electric cell according to claim 1, characterized in that the positive active material is selected from the group consisting of lead oxide (PbO), lead molybdate ($MoO_5Pb$) and minium ($Pb_3O_4$) and in that the electronic conductor is selected from the group consisting of tin, lead and zinc.

6. Electric cell for powering watches or the like comprising a positive electrode containing an intimate intermixture of active positive material and electronic conductor, a negative electrode and electrolyte containing lithium perchlorate in dioxolane solvent, said positive active material being selected from the group consisting of powdered oxides and oxidizing salts which on cell discharge lead to metals selected from the group consisting of lead, tin, zinc and their alloys and said electronic conductor being selected from the group consisting of powdered tin, powdered lead and powdered zinc.

7. Electric cell according to claim 6 wherein said positive active material is powdered lead oxide (PbO) and said electronic conductor is selected from the group consisting of powdered lead, powdered tin and powdered zinc.

8. Electric cell according to claim 6 wherein said positive active material is powdered lead molybdate (MoO$_5$Pb), said electronic conductor is selected from the group consisting of powdered tin and powdered zinc.

9. Electric cell according to claim 6 wherein said positive active material consists of 84% by weight of lead oxide and said electronic conductor consists by weight of 16% of tin.

10. Electric cell according to claim 1 wherein said positive electrode consists of a compressed mixture of powdered material selected from the group consisting of powdered oxides and oxidizing salts whose oxidation in discharge yields metals selected from the group consisting of lead, tin, zinc and their alloys and said electronic conductor consists of powdered metals selected from the group consisting of lead, tin and zinc.

11. Electric cell for powering watches or the like having a positive electrode comprising a positive active material and an electronic conductor in intimate intermixture therewith, a negative electrode, an electrolyte, and a nonaqueous solvent for said electrolyte, said positive active material being selected from the group consisting of powdered lead oxide (PbO), powdered lead molybdate (MoO$_5$Pb) and powdered minium (Pb$_3$O$_4$) and said electronic conductor being selected from the group consisting of powdered tin, powdered zinc and powdered lead.

12. Electric cell according to claim 11 wherein said intimate mixture is compressed.

13. Electric cell according to claim 11 wherein said positive active material consists of powdered lead oxide (PbO) and said electronic conductor is selected from the group consisting of powdered tin, powdered lead and powdered zinc.

14. Electric cell according to claim 11 wherein said positive active material consists of powdered lead molybdate (MoO$_5$Pb) and said electronic conductor is selected from the group consisting of powdered tin and powdered zinc.

15. Electric cell according to claim 11, wherein said positive active material consists of minium (Pb$_3$O$_4$) and said electronic conductor is selected from the group consisting of powdered tin, powdered lead and powdered zinc.

16. Electric cell according to claim 11 including a pair of metallic cups forming a casing, an insulating seal separating said cups, said positive electrode being located in one of said cups facing said negative electrode, said negative electrode being of lithium and located in the other of said cups, separator material between said positive and negative electrodes and said electrolyte being a solution of lithium perchlorate in dioxolane solvent.

17. Electric cell according to claim 11 wherein said positive active material consists by weight of about 84% of powdered lead oxide and said electronic conductor consists by weight of about 16% of powdered tin.

18. Electric cell according to claim 11 wherein said positive active material consists by weight of about 77% of powdered lead oxide and said electronic conductor consists by weight of about 23% of powdered lead.

19. Electric cell according to claim 11 wherein said positive active material consists by weight of about 84.3% of powdered lead oxide and said electronic conductor consists by weight of about 15% of powdered zinc.

20. Electric cell according to claim 11 wherein said positive active material consists by weight of about 95% of powdered lead molybdate and said electronic conductor consists by weight of about 5% of powdered tin.

21. Electric cell according to claim 11 wherein said positive active material consists by weight of about 84.3% of powdered lead molybdate and said electronic conductor consists by weight of about 15.7% of powdered zinc.

22. Electric cell according to claim 11 wherein said positive active material consists by weight of about 84% of powdered minium (Pb$_3$O$_4$) and said electronic conductor consists by weight of about 16% of powdered tin.

23. Electric cell according to claim 11 wherein said positive active material consists by weight of about 77% of powdered minium (Pb$_3$O$_4$) and said electronic conductor consists by weight of about 23% of powdered lead.

24. Electric cell according to claim 11 wherein said positive active material consists by weight of about 84.3% of powdered minium (Pb$_3$O$_4$) and said electronic conductor consists by weight of about 15.7% of powdered zinc.

25. Electric cell powering delicate equipment such as watches, said cell having a positive electrode comprising a positive active material and an electronic conductor in intimate mixture with it, a negative electrode and an electrolyte whose solvent is a non-aqueous liquid, characterized in that the said electronic conductor and the reduction product of the positive active material resulting from the discharge of the cell having a decomposition overvoltage with respect to the said solvent such that the decomposition of the said solvent takes place at a voltage lower than the reduction voltage of the positive active material during the discharge of the cell, thereby reducing the voltage peak at the beginning of cell discharge to close the desired discharge voltage level during use of the cell, and further characterized in that said electronic conductor is a metal selected from the group consisting of powdered lead, tin, zinc, gold, bismuth, cadmium, amalgams and alloys of said metals, and wherein said solvent is compatable with mercury when said conductor is an amalgam of said metals.

* * * * *